United States Patent
Schmidt et al.

(10) Patent No.: US 6,802,527 B2
(45) Date of Patent: Oct. 12, 2004

(54) DEVICES FOR ATTACHING AN AIRBAG TO A VEHICLE

(75) Inventors: Bernhard Schmidt, Maintal (DE); Volker Hofmann, Frankfurt (DE); Markus Richter, Nauheim (DE); Marko Morhard, Mainaschaff (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 75 days.

(21) Appl. No.: 10/290,389

(22) Filed: Nov. 8, 2002

(65) Prior Publication Data

US 2003/0222435 A1 Dec. 4, 2003

(30) Foreign Application Priority Data

Jun. 4, 2002 (DE) .......................... 102 24 726

(51) Int. Cl.⁷ .............................................. B60R 21/20
(52) U.S. Cl. .................. 280/728.2; 280/730.2
(58) Field of Search .......................... 280/728.2, 730.2, 280/730.1, 743.1

(56) References Cited

U.S. PATENT DOCUMENTS

| | | | | |
|---|---|---|---|---|
| 6,220,623 B1 | * | 4/2001 | Yokota .................... | 280/728.2 |
| 6,234,517 B1 | * | 5/2001 | Miyahara et al. ........ | 280/730.2 |
| 6,585,287 B1 | * | 7/2003 | Spaulding et al. ....... | 280/728.2 |
| 6,616,175 B2 | * | 9/2003 | Hofmann et al. ........ | 280/728.3 |
| 6,626,457 B2 | * | 9/2003 | Masuda et al. .......... | 280/728.2 |
| 2002/0017775 A1 | * | 2/2002 | Tanase et al. ............ | 280/730.2 |
| 2003/0205887 A1 | * | 11/2003 | Wallner et al. .......... | 280/730.2 |

FOREIGN PATENT DOCUMENTS

DE    200 20 097 U1    5/2001

* cited by examiner

*Primary Examiner*—David R. Dunn
(74) *Attorney, Agent, or Firm*—Lonnie Drayer

(57) ABSTRACT

A clamp for attaching a folded airbag constituting part of a vehicle occupant restraint system to a vehicle structure has a head for attachment to the vehicle structure and at least one arm adjoining the head for holding the airbag. To prevent an arm being broken away from a clamp, the clamp is of one-armed construction and the one arm is so shaped that the folded airbag, or a pouch containing it, is held at least partially between the single arm and the vehicle structure.

8 Claims, 5 Drawing Sheets

DEVICES FOR ATTACHING AN AIRBAG TO A VEHICLE

FIELD OF THE INVENTION

The invention relates to a devices for attaching a side airbag, sometimes called a curtain airbag, to a vehicle or a vehicle structure. The invention further relates to an assembly of an airbag and a fastening device, such as a clamp for attaching a side airbag to a vehicle or a vehicle structure.

BACKGROUND OF THE INVENTION

Clamps are used in vehicle occupant restraint systems that include an airbag, to attach the airbag in the folded state to a vehicle structure, such as for example the vehicle body. The clamps are used in particular with side airbags, in which the airbag is attached in the folded state along the supporting structure of an automobile for example between the A and B pillars or the A and C pillars on the side facing the inside of the vehicle. A tube-like pouch may surround the folded airbag and, with an inflator, forms an airbag module.

DISCUSSION OF THE PRIOR ART

DE 200 20 097 U1 teaches a clamp for an airbag that has two metal arms. The two arms are connected by a head. They encompass a folded airbag on both sides, such that the airbag is held therebetween. The arms touch one another at the ends thereof remote from the head. When the airbag module is actuated, the airbag held by the clamp is filled very rapidly with gas. During this process, the arms of the clamp are bent apart with great force and at high speed, so that the airbag may pass between them and be deployed. The bending process may cause an arm to break off from the head.

Clamps are also known in which two arms are substantially connected to the end area of the clamp remote from a head by a hinge. The two arms are again connected to the head of such a clamp by a retaining screw that connects the head to a vehicle. The hinge between the two arms takes the form of a predetermined breaking point. When the airbag module is actuated, this predetermined breaking point is opened and the airbag exits between the arms, while one of the arms is again forced with great power out of its rest position or deformed.

SUMMARY OF THE INVENTION

There is provided in accordance with on aspect of the invention a device for attaching an airbag to a vehicle structure, the device comprising a head for attachment to the vehicle structure and at least one arm adjoining the head for holding the airbag, wherein the clamp is of one-armed construction and the one arm is so shaped that the folded airbag or a pouch containing the airbag is held at least partially between the single arm and the vehicle structure.

There is provided in accordance with another aspect of the invention an assembly comprising an airbag and an attachment device for attaching the airbag to a vehicle structure, the airbag being contained in a pouch, the attachment device comprising a head for attachment to the vehicle structure and at least one arm adjoining the head for holding the airbag, wherein the attachment device is a clamp is of one-armed construction and the one arm is so shaped that the folded airbag or the pouch containing the airbag is held at least partially between the single arm and the vehicle structure.

In known airbag clamp designs, a folded airbag is enclosed completely by two arms of a clamp and these two arms are moved apart during inflation of the airbag. According to the invention, on the other hand, a single arm is provided which is attached to the vehicle structure. The single arm holds the airbag or a pouch surrounding it relative to this vehicle structure. Upon deployment, the airbag attached in this way may either exit freely between the single arm and the adjoining vehicle structure or deploy freely at the side of the arm remote from the vehicle structure. An arm is neither bent open or deformed forcefully. Because bending open and deformation of clamp arms is prevented, less force is required for opening and inflating the airbag. This increases process reliability during opening.

According to the invention, a predetermined breaking point on the clamp is also avoided. Therefore, unintentional damage to the airbag or opening of a predetermined breaking point cannot happen either. The risk of such unintentional damage arose previously during production and assembly of a clamp or during actuation of the airbag.

The single arm provided according to the invention generally lies extensively against the vehicle structure and is thereby not exposed to any great load.

The shape of the clamp according to the invention may moreover be produced with little material and with relatively simple tools. Its production costs are therefore altogether lower than with known clamps.

DETAILED DESCRIPTION OF THE INVENTION

Figure 1:
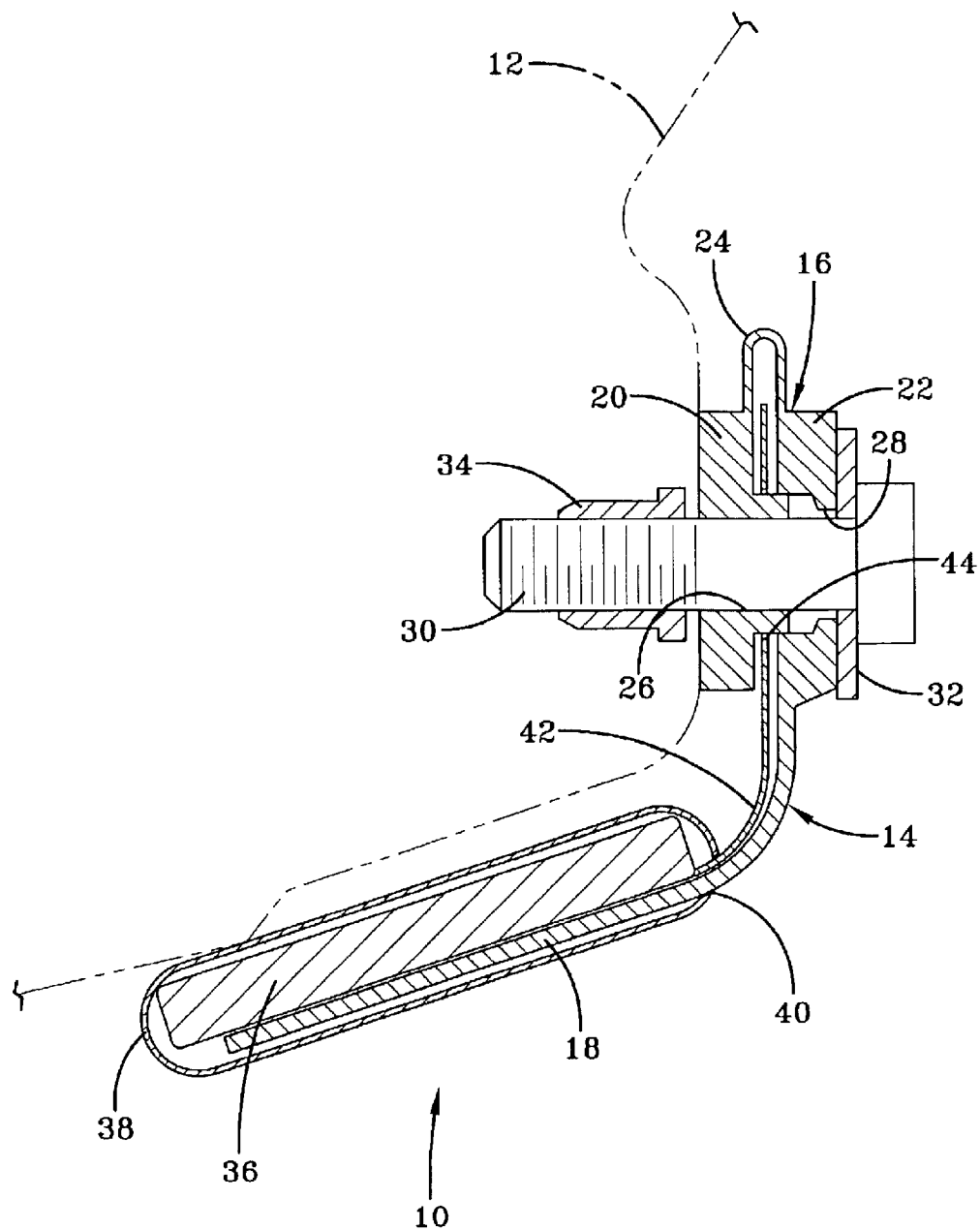
FIG. 1 is a longitudinal section through a first exemplary embodiment of a fastening device according to the invention.

FIGS. 1 to 7 show devices 10 for attaching or fastening an airbag 36 in particular a side airbag, that is part of a vehicle occupant restraint system to a vehicle structure 12. Put another way, FIGS. 1 to 7 show exemplary assemblies of an airbag 36 and an attachment device 14 for attaching the airbag to a vehicle structure 12, the airbag being contained in a pouch 38. The vehicle occupant restraint system is located inside a vehicle such that it will be in the vicinity of the head of a vehicle occupant.

The fastening device 10 according to FIG. 1 is provided with a clamp 14, which comprises a head 16 and a single arm 18 adjoining the head 16. The head 16 is subdivided into a first head portion 20 and a second head portion 22, which may be folded relative to one another by a deformable hinge portion 24 and between which, in the folded-together state, there may be held a flap on the airbag or an airbag flap together with an additional flap on a pouch containing the folded airbag. The arm 18 extends from the second head portion 22, which is spaced from the vehicle structure 12 by the first head portion 20. Two through-holes 26, 28 are formed centrally in the head portions 20, 22. The two through-holes 26, 28 are arranged coaxially when the first and second head portions 20, 22 are folded together. A screw 30 passes through the through-holes 26, 28 beneath the head of which screw 30 there is positioned a washer 32. The screw 30 is screwed into a socket 34 in the vehicle structure 12 and thereby mounts the clamp 14 on the vehicle structure 12, which is represented by a phantom line. By means of the flap or flaps attached in this way, a secure and lasting connection is achieved between the vehicle structure and the airbag. The connection remains reliably in existence even in the case of opening or inflation of the airbag.

The fastening device according to the invention for an airbag may advantageously be designed with a pouch 38 containing the airbag 36, into which pouch the single arm 18 of the clamp 14 projects. The arm thus grips the pouch so-to-speak from the inside out and is supported relative to the vehicle structure 12. In this way, the pouch "hangs" on the single arm according to the invention.

The fastening device 10 is attached to a portion of the vehicle structure 12 that comprises a substantially vertical and a substantially horizontal, downwardly directed area. The screw 30 attaches the head 16 to the vertical area of the vehicle structure 12. The single arm 18 extending from and adjoining the head 16 is bent along the substantially horizontal, downwardly directed area and extends substantially parallel to the vehicle structure 12.

A folded airbag 36 is mounted on the arm 18. The airbag 36 is arranged between the arm 18 and a substantially horizontal area of the vehicle structure 12. The airbag 36 is contained in a pouch 38, in which it is tightly packed. The pouch 38 is provided with an opening 40, through which the arm 18 projects into the pouch 38.

Alternatively or in addition, a flap 42 may be provided on the airbag itself, which is held between two retaining portions of the head of the clamp. The flap 42 is formed on the airbag 36, in the center of which flap there is punched a hole 44. The flap 42 passes beside the arm 18 through the opening 40 to the head 16 of the clamp 14. The flap extends between the two head portions 20, 22 as far as the vicinity of the hinge portion 24. Between the two head portions 20, 22 the flap 42 of the airbag 36 is clamped in a non-interlocking manner on both sides by means of the screw 30. The screw 30 additionally passes through the hole 44 in the flap 42, such that an interlocking connection is also provided between screw and airbag.

Figure 2:
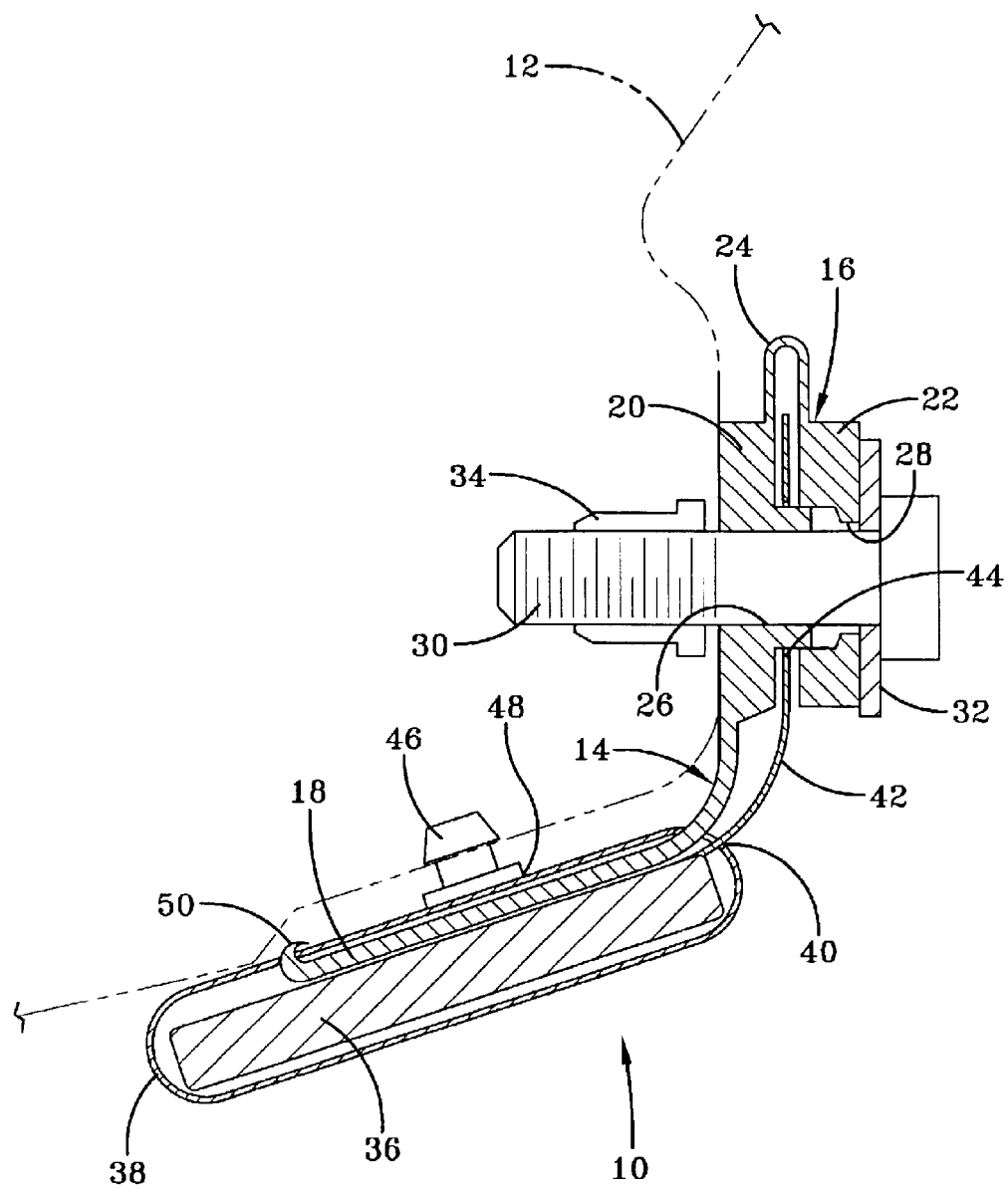
FIG. 2 is a longitudinal section through a second exemplary embodiment of a fastening device according to the invention.

FIG. 2 shows an exemplary embodiment of a fastening device 10 that is constructed to a considerable extent in the same way as the fastening device according to FIG. 1. In this exemplary embodiment, the head 16 of the clamp 14 again consists of two head portions 20, 22. However, in this exemplary embodiment the arm 18 starts from the head portion 20, which lies against the vehicle structure 12.

In order further to improve mounting of the clamp and an associated folded airbag, a prefixing means, in particular a prefixing pin 46, is advantageously provided on the arm 18 for preliminary attachment of the clamp to or pre-mounting thereof on the vehicle. With the prefixing means, the clamp may be clipped to the vehicle structure, until for example the flap has been arranged between the head portions of the clamp and fastened by a screw 30. The arm 18 again extends substantially parallel to the surface of the vehicle structure 12. In its area remote from the head 16, the arm 18 is connected to the vehicle structure 12 by a prefixing pin 46. The connection using the prefixing pin 46 is effected during mounting of the clamp 14, before a screw 30 is screwed into the head portions 20, 22 through the corresponding through-holes 26, 28.

In the exemplary embodiment according to FIG. 2, the arm 18 is again inserted into the pouch 38 through an opening 40. However, the opening 40 is formed in this case on the side or edge of the pouch 38 facing the vehicle structure 12.

A second opening 48 is formed in the pouch 38, through which opening 48 the prefixing pin 46 passes. In addition, in the exemplary embodiment according to FIG. 2, the flap 42 is again formed on the airbag 36. An additional flap 42' may be formed on the pouch 38 (see also FIG. 5), which would then be arranged together with the flap 42 likewise at the head 16.

The arm 18 is inserted into the pouch 38 in such a way that the airbag 36 comes to lie against the side of the arm 18 remote from the vehicle structure 12. Finally, at the end of the arm 18 remote from the head 16 there are also formed two hooks 50, which engage the pouch 38 from inside in an interlocking manner prevent the arm 18 from sliding out of the pouch 38. In addition, a hook for gripping part of the airbag or a pouch containing the folded airbag from behind is advantageously provided on the single arm. The hooks result in an interlocking connection between the airbag or the pouch and the vehicle structure. Detachment of the airbag from the vehicle is reliably prevented with this type of connection.

Figure 3:
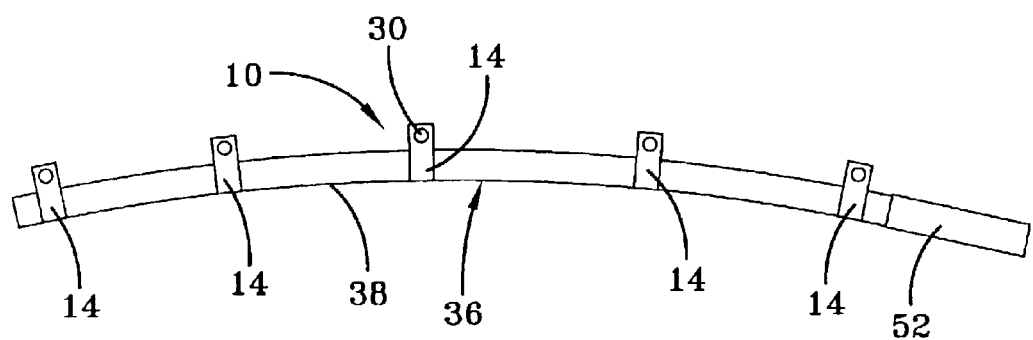
FIG. 3 is a front view of a vehicle occupant restraint system according to the invention with a plurality of above-mentioned fastening devices.

FIG. 3 shows the overall arrangement consisting of airbag 36 with pouch 38 and clamps 14, as attached to a vehicle structure in the head area of a vehicle occupant. An inflator 52, with which the airbag 36 is inflated in a safety-critical situation, is arranged at one end of the airbag 36 folded in the manner of a tube. Alternatively or in addition, a flap may be provided on the airbag itself, which is held between two retaining portions of the head of the clamp.

In addition to the above-mentioned flap for fastening the airbag, an additional flap may be provided particularly advantageously on such a pouch containing the airbag. The additional flap may likewise be held permanently between two retaining portions of the head of the clamp.

Figure 4:
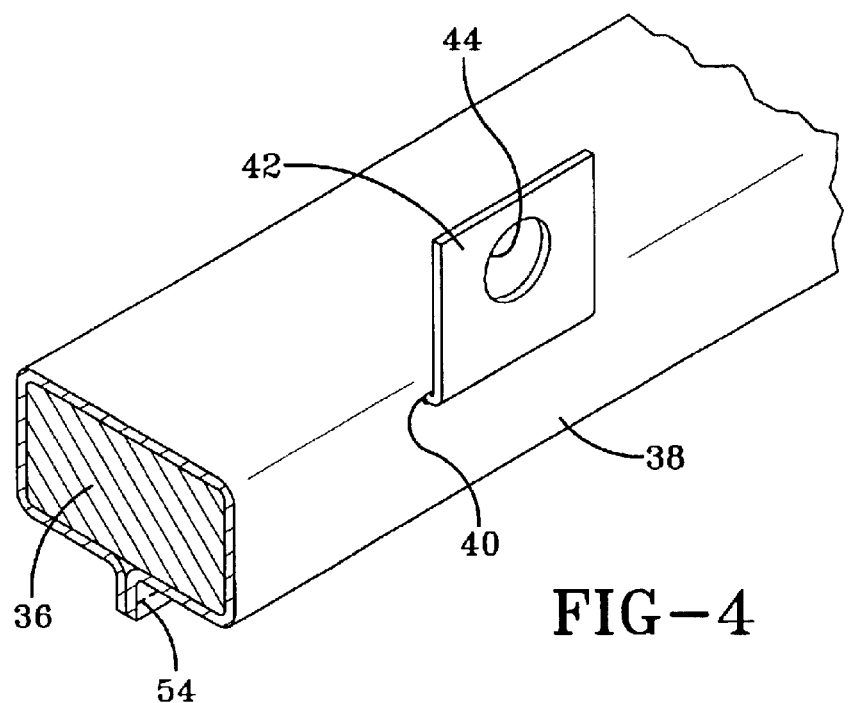
FIG. 4 is a perspective view of a detail of a folded airbag with pouch, as used in the above-mentioned first exemplary embodiment.
Figure 5:
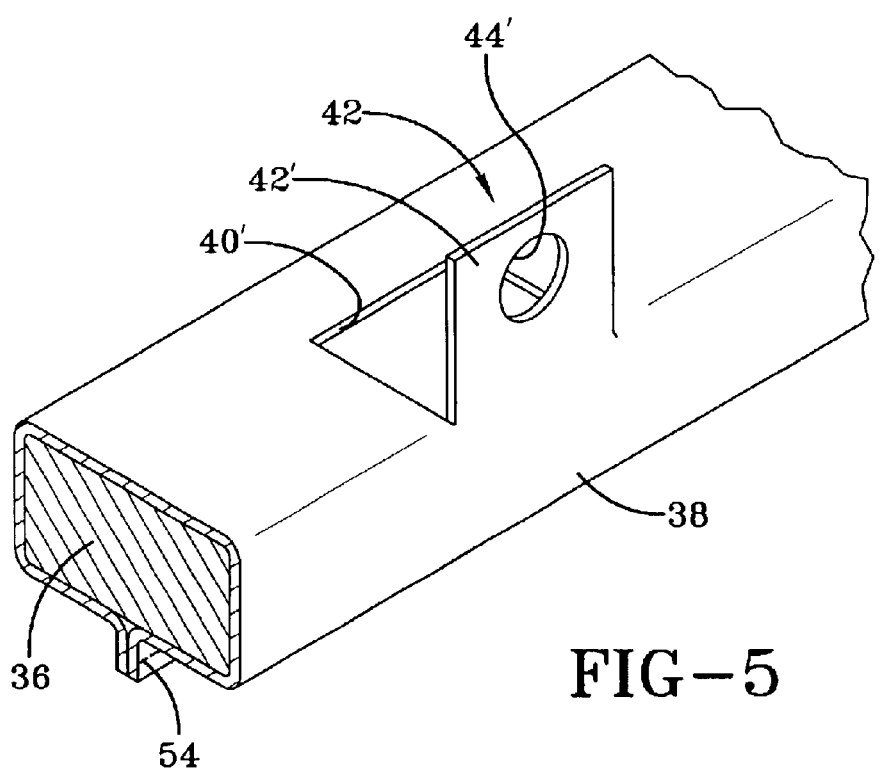
FIG. 5 is a perspective view of a detail of a folded airbag with pouch, as used in the above-mentioned second exemplary embodiment.

FIGS. 4 and 5 show in detail how the flaps 42, 42' are formed on an airbag 36 or on a pouch 38.

The flap 42 according to FIG. 4 is attached to the airbag 36 and passes outwards through an oblong opening 40 in the pouch 38. The pouch 38 is laid tightly around the airbag 36 and closed in the manner of a tube by a seam 54. When the airbag 36 is inflated by the inflator 52, the seam 54 is torn open and the airbag 36 is deployed out of the pouch 38. In the exemplary embodiment according to FIG. 1, it passes downwards out of the gap between the arm 18 and the vehicle structure 12.

FIG. 5 shows an exemplary embodiment in which an additional flap 42' is provided on the pouch 38 beside the flap 42 (not illustrated) on the airbag 36. The additional flap 42' is formed out of the fabric of the pouch 38, wherein an opening 40' is formed. The opening 40' may be formed particularly simply and economically at the additional flap in the airbag containing pouch by cutting the additional flap out of the pouch. In this way, in only one step, the flap is cut out and at the same time the opening is formed through which the single arm according to the invention is subsequently introduced into the pouch.

The opening 40' corresponds in function to the opening 40, such that the arm 18 may subsequently be pushed therethrough into the pouch 38. The flap 42' comprises a hole 44' therethrough, as does the flap 42 on the airbag 36. When the flap 42' is arranged at the head 16, the shank of the screw 30 is passed through this hole 44' and the flap 42' is attached in this way beside the flap 42 between the head portions 20, 22. Thus the pouch can be gripped "from the inside out" by means of the single arm 18 such the single arm of the clamp projects into the pouch. The flap then extends directly in the vicinity of the arm along the clamp to the head thereof. Thus, a compact and permanent connection is formed between clamp, pouch and folded airbag.

Figure 6:
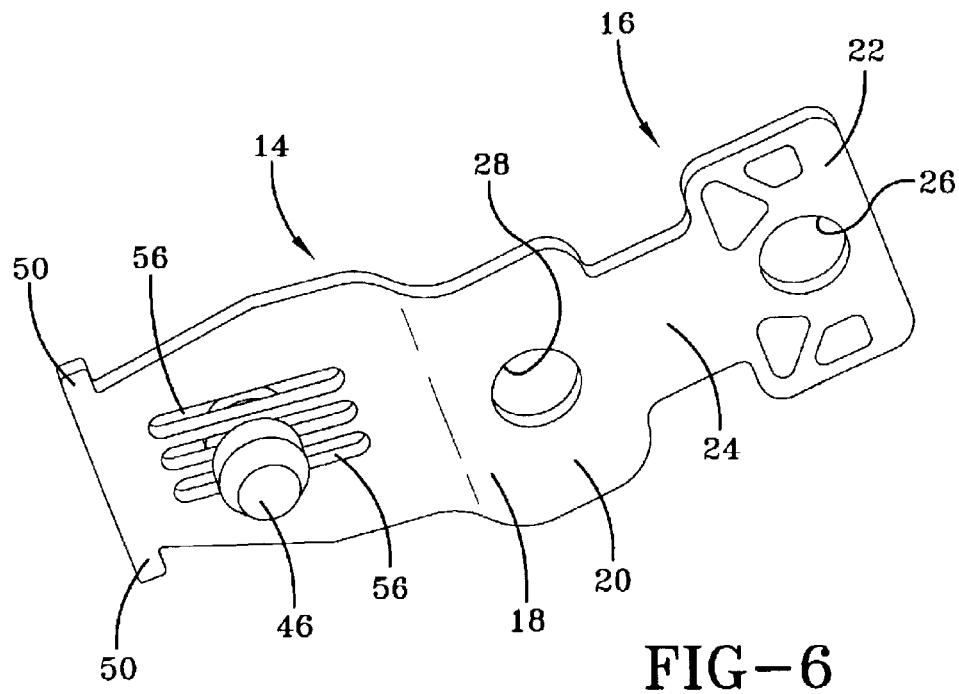
FIG. 6 is a perspective view of an exemplary embodiment of a clamp according to the invention with a folded-open head.
Figure 7:
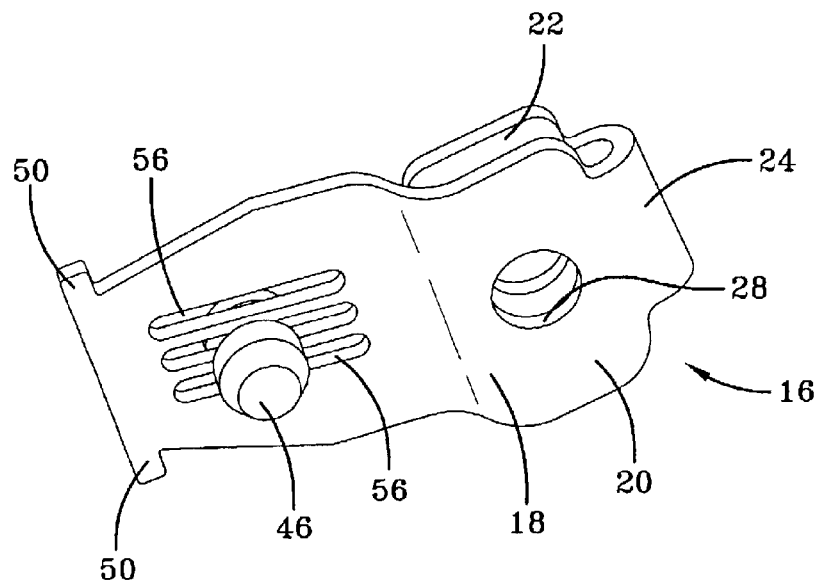
FIG. 7 is a perspective view according to FIG. 6 of the clamp with a closed head.

FIGS. 6 and 7 are perspective, detailed views of a clamp. Of particular note is the tapered hinge portion 24 between the two head portions 20, 22. In addition, the hooks 50 are formed in such a way that they project outwards to the sides. In the case of the clamp 14 according to FIGS. 6 and 7, the prefixing pin 46 may be arranged displaceably in channels 56, in order to allow post-adjustment of the clamp 14 on the vehicle structure 12 prior to screwing in of the screw 30.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

What is claimed is:

1. An assembly comprising a folded airbag contained in a pouch and an attachment device for attaching the airbag to a vehicle structure, the attachment device being a holding clamp comprising a head for attachment to the vehicle structure and at least one arm adjoining the head for holding the airbag, wherein the holding clamp is of one-armed construction and the one arm is so shaped to be inserted into the pouch such that the folded airbag or the pouch containing the airbag is held at least partially between the single arm and the vehicle structure, wherein upon deployment the airbag may either deploy freely between the single arm and the adjoining vehicle structure when the airbag and pouch are positioned between the single arm and the vehicle structure, or deploy freely at the side of the single arm remote from the vehicle when the airbag or pouch is hanging from the single arm, the single arm being neither bent nor deformed forcefully during deployment, the head of the attachment device comprises two retaining portions, which are connected with a hinge portion and between which, in the folded-together state, there may be held a flap on the airbag or an airbag flap together with an additional flap on the pouch containing the folded airbag, and an opening is formed in the airbag containing pouch at the flap, through which opening the single arm of the clamp projects into the pouch.

2. The assembly according to claim 1, wherein a prefixing means, the prefixing means is a prefixing pin provided on the single arm for preliminary attachment of the device to the vehicle structure.

3. The assembly according to claim 1, wherein a prefixing means, the prefixing means is a prefixing pin provided on the single arm for preliminary attachment of the device to the vehicle structure.

4. The assembly according to claim 1, wherein a hook for gripping part of the airbag or the pouch containing the folded airbag from behind is provided on the single arm.

5. The assembly according to claim 1, wherein a hook for gripping part of the airbag or the pouch containing the folded airbag from behind is provided on the single arm.

6. The assembly according to claim 2, wherein a hook for gripping part of the airbag or the pouch containing the folded airbag from behind is provided on the single arm.

7. The assembly according to claim 3, wherein a hook for gripping part of the airbag or the pouch containing the folded airbag from behind is provided on the single arm.

8. The assembly according to claim 1, wherein the opening at the flap is formed in the airbag containing pouch by cutting the flap out of the pouch.

* * * * *